Dec. 8, 1942.  J. R. LEISURE  2,304,107
NUT ANCHOR
Filed Nov. 24, 1941
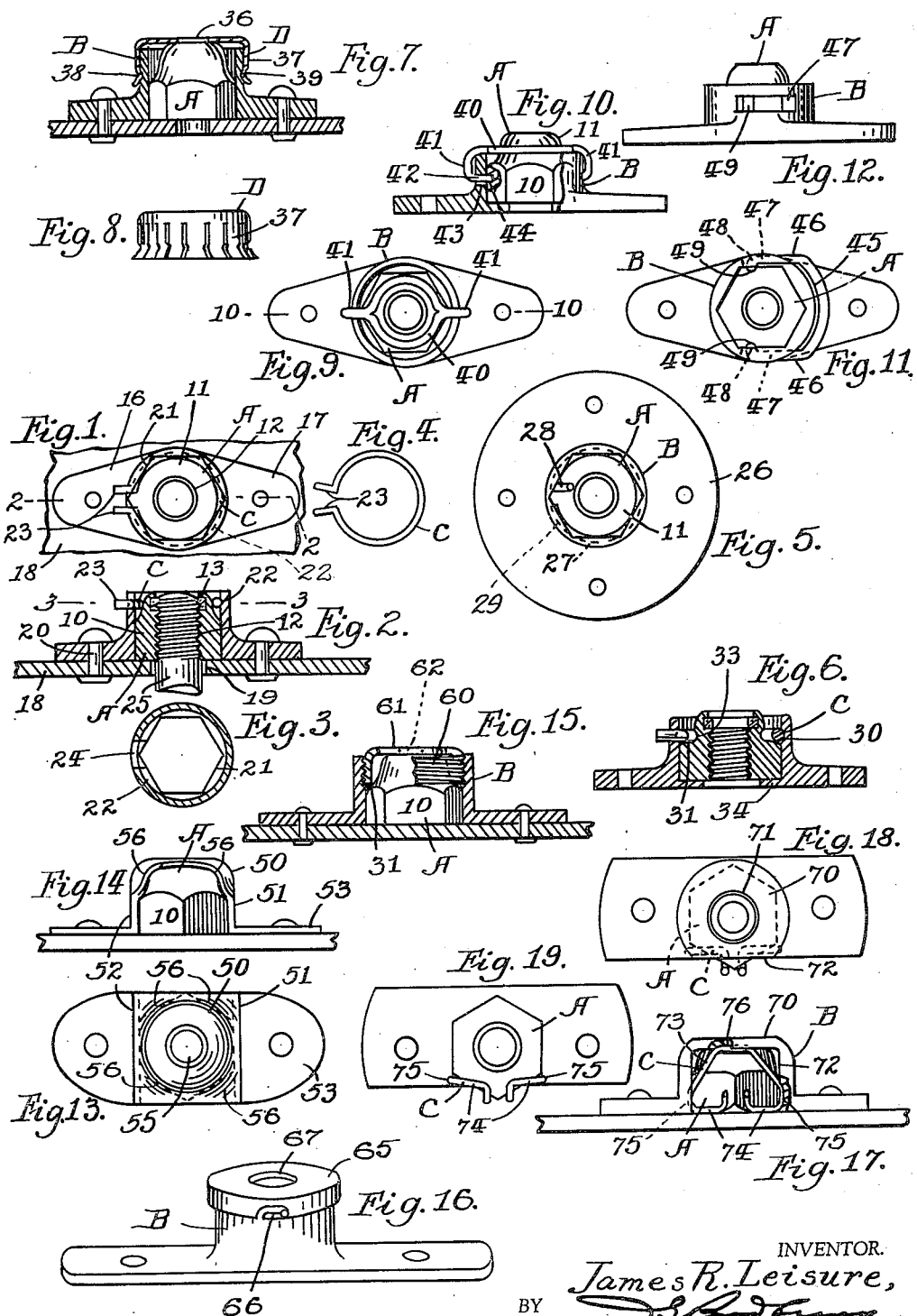
INVENTOR.
James R. Leisure, Patented Dec. 8, 1942

2,304,107

UNITED STATES PATENT OFFICE 2,304,107

NUT ANCHOR

James R. Leisure, Compton, Calif.

Application November 24, 1941, Serial No. 420,169

9 Claims. (Cl. 85—32)

This invention relates to improvements in nut anchors, the primary object being to provide improved means for removably and firmly holding a nut juxtaposed to a bolt receiving opening in a plate or other object to which it is desired to secure a bolt. This improved nut anchor is particularly although not exclusively useful with self locking nuts of that type in which the nut body has flat sides and the upper end tapers outwardly and is annular in cross section and the threaded bore thereof has an annular insert of tough compressible material, such for example as vulcanized fiber which is adapted to be penetrated by the threads of a bolt when the nut and bolt are screwed together so that unintentional relative movement between the nut and bolt is prevented.

The nut is adapted to be held firmly and securely by my improved nut anchor but when desired may be easily and quickly detached and replaced by a fresh nut. The nut holding shell forming part of my improved anchor is adapted to be fastened on any object to which it is desired to anchor a bolt. My improved nut anchor is particularly although not exclusively useful in air craft, automobile and other structural, fabrication work.

The various figures of the accompanying drawing show various adaptations of my improved nut anchor and modifications thereof. In the drawings forming part of this specification, Fig. 1 is a plan of my improved nut shell which is shown applied to a piece of sheet material and holding a nut; Fig. 2 is a vertical section taken on the line 2—2 of Fig. 1, showing a portion of a bolt attached as when in use; Fig. 3 is a cross section of the nut shell taken on line 3—3 of Fig. 2; Fig. 4 is a plan of the nut retainer for releasably holding the nut in the nut shell; Fig. 5 is a plan showing a slightly modified form of my improved nut anchor; Figs. 6 and 7 are central longitudinal sections of other modifications; Fig. 8 is a side elevation of the nut retaining cap shown in Fig. 7; Fig. 9 is a plan of a modified form of my improvement; Fig. 10 is a section taken on line 10—10 of Fig. 9; Fig. 11 is a plan of a modification; Fig. 12 is a side elevation of the structure shown in Fig. 11, when the nut retainer is removed; Fig. 13 is a plan of a modification; Fig. 14 is a side elevation of the structure shown in Fig. 13; Fig. 15 is a central longitudinal section of another modification, part of the retainer being shown in full; Fig. 16 is a perspective view of still another modification; Fig. 17 is a side elevation of another modified form of my invention; Fig. 18 is a top plan of the structure shown in Fig. 17, and Fig. 19 is a bottom plan of the structure shown in Fig. 17.

A nut A such as above referred to is shown in the various figures of the drawing, and comprises a flat sided body 10 which is substantially normal to its base and hexagonal in cross section. Its upper longitudinal end 11 tapers upwardly in a reverse curve and is circular in cross section. A threaded bolt receiving bore or passage 12 penetrates the nut longitudinally and an annular vulcanized fiber insert 13 is placed in the wall of the outer portion of the bore so that when a bolt is screwed into the nut it is penetrated by the threads of the bolt to prevent or retard the nut from turning and loosening on the bolt.

Referring particularly to Figs. 1 to 4, inclusive, my invention comprises an outer shell B having an upstanding wall and a supporting base of any suitable construction, which base in Figs. 1 to 4, comprises a pair of oppositely disposed supporting flanges 16 and 17. These flanges are adapted to be fastened on any object with which the nut shell is used, such for illustration as a plate 18 having a bolt receiving opening 19 with which the shell is coincident. The fastening means may be rivets such as 20, bolts, screws, etc. As shown the outer surface of the wall of the shell is cylindrical but it may be any desired contour. The inner surface of the wall is flat sided at 21 to correspond with and engage the flat sides of the body 10 of the nut A. As illustrated the nut is hexagonal in cross section and the inner surface of the wall of the shell is of corresponding shape so that the nut will seat freely and be securely held from turning in the socket thus provided. The wall of the shell extends above the body 10 of the nut sufficiently to permit of providing a shallow annular inner groove 22 in which a split, annular, resilient nut retaining ring C is adapted to engage the side of the outer tapering end 11 of the nut and to lock the nut from unintentional removal from its socket. The retainer ring C has a pair of outstanding hand gripping arms 23 on its extremities which in the normal condition of the ring are separated and by compression are adapted to contract the ring so that it can be removed from the socket in the shell to release the nut. The upper edge of the shell is provided with a transverse channel 24 which connects with the annular retainer groove 22 through which the gripping arms 23 of the retainer spring project outwardly to permit the contraction of the ring which is necessary for releasing the nut. The retainer thus engages the inner wall of the socket of the shell due to its expansive force.

The width of the channel 24 is sufficient to accommodate the arms when the retainer ring is fully expanded. The ring can be contracted by compressing both of said arms or only one.

In use the nut A is juxtaposed over the bolt hole 19 in the plate 18 on which the shell is shown mounted and is held firmly from turning by the shell. It is held securely against removal from the shell by the retainer C so that the bolt, such as 25 can be screwed into the nut. When detached from the bolt the nut can be easily removed by contracting and removing the retainer ring C. Thus the nut can be easily and quickly adjusted in the nut shell and held firmly in readiness for use or can be easily removed or replaced by a fresh nut. Also when adjusted in the shell it is held securely and firmly against unintentional removal. The construction thus provided is extremely simple, durable and inexpensive and is not likely to get out of order which are advantages. As a result the invention lends itself readily to mass production in the assembly of the nut and anchor, particularly although not exclusively in the air craft and automobile industry.

In Fig. 5, the nut shell B is shown integral with a single annular flange support 26 and is similar in construction to the shell shown in Fig. 1 except that the transverse channel 24 is not employed. In this construction the split spring retainer ring 27 has only one of its ends inturned at 28 by which the ring can be forced to contract from engagement with the inner annular groove 29. This groove is shown at 22 in Fig. 1. The retainer ring can be forced down while contracted over the outer end 11 of the nut A and expanded into engagement with the wall of groove 29 to lock the nut in the shell or it can be released by inserting a tool below the inturned end 28 and springing the ring out of engagement.

In Fig. 6 the construction is different from that shown in Fig. 1 in that the split expansible retainer ring C engages in the shallow annular groove 30 in the socket shell and over an abrupt shoulder 31 on the nut below the tapering outer end 11 to lock the nut in the socket shell. Also at the junction between the flat sided body of the nut and said upper tapering end the nut has an annular channel 33 in which the retainer ring is adapted when contracted to engage the nut. Thus the nut can be lifted out of its socket by merely contracting the retainer and lifting it by means of the hand grips 23. This feature facilitates the removal and handling of the nut. Annular flange 34 supports the nut independently of plate 18.

In the above described constructions the nut retaining means resembles a split contractible spring ring which produces a removable lock between the nut and inner wall of the nut holding shell. This specific feature may be variously modified. For illustration, in Figs. 7 and 8, the removable holding element is secured over the outside of the shell and resembles a circular cap D which closes over the outer end of the nut shell B and has a central passage 36 juxtaposed to the outer end of the threaded bore of the nut A to admit the bolt into engagement with the nut. The periphery of this cap has an annular series of integral down turned spring arms 37, the lower extremities of which are indented at 38 to engage in a shallow annular groove 39 in the outer surface of the nut shell B. This spring cap grasps the outer end of the shell and removably retains the nut therein under the resilient engagement of the spring arms and the body of the shell.

In Figs. 9 and 10 the retainer is modified and consists of a spring wire loop 40 which encircles the outer end 11 of the nut and releasably engages the nut shell B by means of a pair of diametrically opposite downturned spring arms 41. These arms have lower inturned ends 42 which releasably penetrate the openings 43 in the wall of the nut shell and engage the body 10 of the nut A in sockets 44 to lock the nut securely in the nut shell.

In Figs. 11 and 12 the construction is similar to that shown in Figs. 9 and 10 excepting that the loop 40 is substituted by a single yoke 45 which spans the wall of the nut shell and has a pair of arms 46 penetrating the shell through a pair of oppositely disposed horizontal slots 47 and engaging the nut. The extremities of these arms have inwardly directed jaws 48 which bite into the nut and engage its body in oppositely disposed cavities 49. By this construction the nut retainer can be easily sprung into interlocking engagement between the nut and nut shell or released therefrom.

In Figs. 13 and 14 the nut shell and retainer are made integral out of a single stamping. The shell proper resembles a broad yoke 50 made out of thin spring material having a pair of opposite flat sides 51 and 52 on the supporting flanges 53. The nut is adapted to be placed through its opening with a pair of the flat sides of its body 10 engaged between the flat sides 51 and 52 of the nut shell to prevent turning and misplacement. The body of the yoke releasably engages under downward spring pressure over the outer tapering end of the nut and with a bolt receiving passage 55 juxtaposed to the bore of the nut. The body is formed with four evenly distributed spring shoulders 56 which normally engage over the outer end 11 of the nut and prevent unintentional detachment. The nut can however be forced outwardly from below these shoulders through either open side of the nut shell when it is desired to detach the nut from the shell.

Fig. 15 shows the nut retainer modified and in the form of a horizontal ring 60 screw threaded downwardly into the outer end of the nut shell B and seated upon the shoulder 31 of the nut body 10 to hold the nut A in the shell. A yoke 61 is provided on the ring which threadedly engages over the outer end of the nut and by which the ring can be turned to apply or remove the retainer. A passage 62 is also provided downwardly through the median portion of the yoke to admit a bolt into or out of engagement with the bore of the nut.

In Fig. 16 the retainer resembles a detachable cap 65 which is fastened over the outer end of the body of the nut shell B by suitable separable means such as the bayonet joint 66. The cap in this construction also has the bolt receiving passage 67 near its center which is in juxtaposition over the threaded bore of the nut in the shell.

In Figs. 17 to 19, inclusive, the nut shell body B in which the nut is held from turning is closed on its outer end 70 excepting the bolt receiving opening 71 which is juxtaposed to the bore of the nut A. One side of the shell is open at 72 to admit the nut into or permit its removal laterally from the shell. A spring wire retainer C is inserted into the nut shell body in the path of the nut to prevent removal of the nut. This retainer is formed with a yoke 73 and a pair of inturned spring expansible arms 74 which are adapted to releasably engage in notches or grooves 75 and below inwardly engaging edges or lips such as 76 bordering the passage 72 to prevent normal displacement of the retainer but permit intentional detachment to free the nut.

While I have described my improvement for use in holding a flat sided nut and particularly for holding nuts which are hexagonal in cross section, I wish it understood that the construction is only illustrative and that the invention within the spirit thereof and within the scope of the following claims can be equally applied for removably holding nuts of other shapes and of other construction than as described.

I claim:

1. An anchor for a nut which has a flat sided body and an annular outer end, comprising, a socket bounded by a continuous wall open at its outer end and having a flat sided lower portion and an annular retainer groove in its inner upper portion, said flat sided body substantially coinciding in cross section with and adapted to receive and hold the body of said nut from turning with said annular end directed upwardly and an expansible retainer ring seated in said groove and engaging downwardly upon the annular end of said nut to block the unintentional removal of the nut from said socket, said retainer ring being freely contractible to disengage from the socket and release the nut.

2. An anchor for holding a nut which has a flat sided body, an annular upper end and a bore upwardly therethrough, comprising, a socket shell bounded by a wall having a nut receiving opening and a flat sided lower portion corresponding in cross section with a portion of the body of the nut to receive and hold the nut from turning with the upper end of the nut directed upwardly within said shell, and a retainer detachably secured to said socket shell and blocking the removal of the nut outwardly from within said socket.

3. In a structure as defined in claim 2, the nut receiving opening in the socket shell being in the upper end of the shell and the retainer being releasably engaged with the upper end portion of the wall of said shell and over the annular upper end of the nut and having a bolt receiving passage juxtaposed to the bore of the nut.

4. An anchor for a nut which has a flat sided body and an annular outer end, comprising, a socket shell bounded by an annular continuous side wall open at its outer end, said socket shell having a flat sided inner wall corresponding in cross section with that of the body of said nut to receive and hold the latter from turning with its annular outer end extending upwardly and having an inner annular groove in its upper end, and a contractible spring retainer expanded into engagement with the inner wall of said socket shell in said annular groove and blocking the nut against unintentional removal from said shell.

5. An anchor for a nut which has a flat sided body, an annular upper end and an abrupt annular shoulder between said body and upper end, comprising, a socket shell bounded by a continuous annular side wall open at its upper end and having supporting means extending outwardly from its lower end, a flat sided inner wall corresponding in cross section with that of the body of said nut to receive and hold the latter from turning, and an annular groove in the inner wall of said socket shell adjacent to said shoulder on said nut, and a contractible spring retainer expanded into releasable engagement with the inner wall of said socket shell in said groove over said shoulder to releasably retain the nut in said socket shell.

6. An anchor for a nut which has a flat sided body, comprising, a nut holding socket shell bounded by a continuous wall having an inner surface composed of flat surfaces corresponding with the sides of said body to engage and prevent the nut from turning, a normally open upper end through which the nut is removable, a resilient retainer ring expanded into engagement with retaining means on the inner wall of said socket shell, normally blocking the removal of the nut through its upper end and contractible against spring tension to remove the ring and release the nut through the upper end of the socket shell.

7. An anchor for a nut which has a flat sided body and an outwardly tapering upper end, comprising, a nut holding socket shell bounded by a continuous wall having a normally open upper end and flat inner walls corresponding in cross section with that of the body of said nut to receive the nut through said upper end and hold it from turning, and a contractible spring retainer ring normally expanded into engagement with retainer means on the inner wall of the socket shell and bearing upon said tapering surface of the nut through the upper end of the shell.

8. An anchor for a nut which has polygonal flat side walls, comprising a socket for holding the nut having inner flat surfaces engaging the nut to prevent its rotation, a normally open upper end through which the nut is removable, an inner circuitous shoulder over the nut, and a lateral passageway through its wall extending outwardly beyond said shoulder, and a contractible retainer normally expanded into engagement below said shoulder to block the removal of the nut through the open end of said socket and having a hand gripping arm extending freely through said passageway by which the retainer can be contracted and disengaged from below said shoulder and removed from the socket.

9. An anchor for a nut which has a flat sided body, comprising, a nut holding socket shell bounded by a continuous wall having an inner surface composed of flat surfaces corresponding with the sides of the body to engage and prevent the nut from turning, a normally open upper end through which the nut is removable, an inner shoulder in the lower end of the socket shell by which the nut is supported in said shell, and a retainer ring expanded into engagement with retainer means on the inner wall of said socket shell, normally blocking the removal of the nut through its upper end and contractible against spring tension to remove the ring and release the nut through the upper end of the socket shell.

JAMES R. LEISURE.